United States Patent [19]

Chay

[11] 4,042,731
[45] Aug. 16, 1977

[54] FOAMING AGENTS FOR GALVANIZING FLUXES

[75] Inventor: Dong Myung Chay, Wilmington, Del.

[73] Assignee: E. I. Du Pont de Nemours and Company, Wilmington, Del.

[21] Appl. No.: 629,548

[22] Filed: Nov. 6, 1975

[51] Int. Cl.$^2$ ............................................. C23C 1/12
[52] U.S. Cl. .................................. 427/311; 427/436; 427/433; 148/23; 148/26
[58] Field of Search ............................. 148/23, 24, 25; 427/436, 433, 311

[56] References Cited

U.S. PATENT DOCUMENTS

| | | | |
|---|---|---|---|
| 1,965,760 | 3/1932 | Baldwin | 427/311 X |
| 2,311,669 | 2/1943 | Kepfer | 148/23 |
| 2,473,580 | 6/1949 | Eubank et al. | 148/23 |
| 2,547,771 | 4/1951 | Pessel | 148/23 |
| 2,940,870 | 6/1960 | Baldwin | 427/311 |
| 3,723,191 | 3/1973 | Bos et al. | 148/23 |
| 3,925,112 | 12/1975 | Petersen et al. | 148/23 |

Primary Examiner—Ralph S. Kendall
Assistant Examiner—Charles R. Wolfe, Jr.

[57] ABSTRACT

A process which involves galvanizing with a galvanizing flux consisting essentially of a fluxing material selected from zinc ammonium chloride double salt and a mixture of zinc chloride and ammonium chloride and, as a foaming agent, sorbitol by dipping a metal article into a molten bath of zinc covered by said flux.

6 Claims, No Drawings

FOAMING AGENTS FOR GALVANIZING FLUXES

BACKGROUND OF THE INVENTION

1. Field of the Invention

This invention relates to galvanizing fluxes, their composition and their use. More particularly, this invention relates to flux compositions containing novel foaming compounds.

2. Prior Art

In hot-dip galvanizing a bath of molten zinc is covered with a flux usually referred to as a top-flux and articles to be galvanized are lowered into the molten zinc bath through the flux. The top flux layer cleans and prepares the article for the reception of a metal coating. It is known in galvanizing practice to add a small amount of an organic material to the top-flux such as ammonium chloride or zinc ammonium chloride to produce a frothy layer on the surface of the molten metal in the galvanizing pot. A flux which in use forms such a frothy layer is known as a foaming flux or a foaming top-flux. This froth or foam serves to trap vapors and gases and retard the rate of volatilization of the flux. Additionally, the foaming flux must be of sufficient depth to permit the flux to clean the article to be dipped before contacting the molten metal. The use of fluxes with foaming agents permits a continuous, adherent film of zinc which is substantially free of pin holes and other impurifications on the surface of the metallic article to be galvanized. Organic materials commonly used to cause foaming are bran, glycerol, tallow, sawdust and certain cellulose derivatives. These foaming agents suffer from the disadvantages that after a period of use they cause the viscosity of the flux to increase thereby retarding the rate of wetting of the article to be galvanized which leads to imperfect galvanizing, making it difficult for their metal objects to penetrate the flux and increasing the rate of which the flux is carried away with the finished article.

SUMMARY OF THE INVENTION

In accordance with the invention, a new fluxing composition has been discovered which contains a novel foaming agent, sorbitol. Thus, the composition of the present invention consists essentially of a fluxing material, selected from zinc ammonium chloride double salt and a mixture of zinc chloride and ammonium chloride and sorbitol, the sorbitol being from about 0.2 to 1.0% by weight of the fluxing material. The invention also involves the use of the new fluxing compositions in galvanizing processes. The process of the invention involves the use of a novel and unobvious fluxing composition in the galvanizing of ferrous metals by using said fluxing composition as a top-flux.

While the fluxing material of the present invention is ammonium chloride and zinc chloride or zinc ammonium chloride double salts, the active fluxing agent is ammonium chloride. The amount of fluxing material may vary widely. Preferably the fluxing material will range from 99 to 99.8% by weight of the fluxing composition.

To make a flux of this invention there is added to a major proportion of zinc chloride and ammonium chloride or zinc ammonium chloride double salt a minor proportion of sorbitol. If too large a proportion of sorbitol is used the flux will foam excessively and be difficult to use, while if the proportion is too small the advantages of the invention will not be fully realized. It has been found that the sorbitol is extremely effective at 0.2 to 1.0% by weight based on the mixture of ammonium chloride and zinc chloride or zinc ammonium chloride double salt.

The sorbitol may be added to the molten fluxing material of the present invention on the molten metal in the galvanizing pot. However, this involves the problem of distribution; that is, time and attention is required to insure a uniform distribution of the sorbitol throughout the fluxing agent. It is therefore preferred to incorporate the sorbitol in the fluxing agent prior to adding the flux to the galvanizing pot. This may be done by adding the sorbitol to the granular ammonium chloride and zinc chloride or zinc ammonium chloride double salt with mechanical agitation as, for instance, in a tumble mill. The products so produced are fluxes of maximum economy which can be used in the galvanizing plant with assurance of uniformity and without the close supervision attending the proportioning of the ingredients at the point of use.

Generally galvanizing of a metal article from the standpoint of the flux can be accomplished two ways. One way is by a pre-flux which merely involves coating the article to be galvanized with an aqueous solution of the flux before contacting the article with the molten metal. The other way is by a top-flux which involves the use of a flux composition over the surface of the molten metal for galvanizing. The process of the present invention involves galvanizing with a top-flux.

The foaming action of a galvanizing flux requires two conditions. The flux must liberate gas(es) upon melting, the molten flux must also give sufficiently high surface tension to be able to support the gas.

Commercial fluxes contain $NH_4Cl$ which decomposes into $HCl$ and $NH_3$ gases upon heating. It is believed that during the flux heating, the foaming agent decomposes and forms a polymeric meterial(s). A small amount of the polymeric material from the decomposition of the foaming agent is distributed throughout the molten flux thereby increasing the surface tension of the molten flux liquid, i.e., the flux viscosity. Some increase in surface tension is beneficial. However, the use of too much foaming agent has a detrimental effect on the galvanizing operation because the flux becomes too viscous.

The flux foam should be as fluid as possible so that the galvanizing article can be immersed into the molten zinc readily. If the flux is too viscous, the article can "float", interfering with the galvanizing operation. Also, when a flux is too viscous, the galvanizing article will not be wetted properly by the flux and therefore will result in a nonuniform, defective coating of zinc.

It has been surprisingly found that sorbitol can effectively be used as a foaming agent in fluxes containing ammonium chloride, preferably at levels of from 0.2 to 1.0% by weight based on the mixture of ammonium chloride and zinc chloride or zinc ammonium chloride double salt.

Sorbitol has the following structural formula

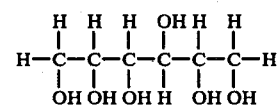

It is used in the preparation of ascorbic acid and various food products. It can be prepared by pressure hydrogenation of dextrose in the presence of a nickel catalyst. It is widely available commercially.

In illustrating the process of the present invention in the examples that follow, 600 gram samples of flux were prepared by mixing −40 mesh powders of sorbitol with flux compositions comprising granular metal halides and ammonium chloride without any foaming agent by tumbling them in a quartz glass bottle (3 diameter × 6½ inches height) on rollers at 80 RPM. At the end of 30 minutes a 200 gram sample of flux thus prepared was placed on the surface of a galvanizing bath (10 × 10 inches) divided into two sections 5 wide × 10 inches long using a steel divider containing molten zinc at 455° C.

The flux was placed on the middle surface of the bath area and allowed to melt away until it covered the entire molten zinc surface. The flux thus added developed foam as it melted. The following properties of the thus prepared flux samples were determined:

Foam Height - There must be a sufficiently thick layer of foam developed during the heating of the flux so that the galvanizing operation can be carried out properly. The flux foam provides a protection against zinc (molten) oxidation by serving as a mechanical barrier for oxygen in the air. The foam also promotes the effectiveness of galvanizing by allowing the galvanizing article to be cleaned more thoroughly free of rust and other foreign contamination so the article goes through the foam layer before being dipped in the molten zinc.

In general, as long as the foam remains fluid, the thicker the foam layer the better the flux.

Time for Maximum Foam Height - For efficient galvanizing operation the more rapidly the foam layer is built up the better.

Foam Stability - For practical considerations, the flux foam should be as stable as possible. The stability of the foam was measured by the amount of time elapsed from the beginning of heating to the time when the foam began to shrink from the maximum height.

Maximum Foam Height after Regeneration - As a measure of how readily the flux foam can be regenerated after shrinking or collapsing, the maximum foam height is measured after the foam was stirred five times with a 1¾ inches wide steel spatula in a circular motion for one minute. The foam should be readily regenerated into a thick layer.

Flux Viscosity - After the flux was heated for ten minutes, a 1¾ inches wide steel spatula was drawn across the middle of the flux dividing the flux perpendicular to 10 inch side of the bath. The amount of time required for the separated flux layers to join together was measured as the flux viscosity.

Smoke Level - The amount of smoke liberated from the flux should be minimal from the pollution standpoint. Therefore, the foaming agent should not increase the smoke level more than what is already present in the flux composition without the foaming agent.

The smoke level was determined visually.

EXAMPLES 1-6

Soft steel coupons of 3½ × 2½ × ⅛inches in size were first degreased by heating in a solution prepared by dissolving 39 grams of sodium hydroxide, 104 grams of sodium metasilicate and 2.5 grams of sodium hydrocarbon sulfonate wetting agent in a sufficient amount of water to make a one gallon solution. After being heated at 90° C for 20 minutes in this solution, the coupons were pickled in a 10% sulfuric acid solution at 70° C for 20 minutes. After being rinsed with water, the coupons were allowed to dry.

When the coupons were dry, they were lowered slowly into the molten zinc through the flux foam prepared as described above. The coupons were held in the zinc for 90 seconds before withdrawing. When the coupons were cooled, the zinc coating was inspected for defects with a microscope at 10X magnification. The table below summarizes the data for Examples 1-6.

EXAMPLES A AND B

The procedure of Examples 1-6 was followed except that fluxes with pentaerythritol and hexamethylenetetramine as a foaming agent were used. The data is also summarized in the table below. Quite surprisingly, sorbitol performed equally as well as known foaming agents, such as pentaerythritol and hexamethylenetetramine.

TABLE
SORBITOL AS A FOAMING AGENT FOR GALVANIZING FLUXES

| | Flux Composition | | | | Foaming Agents | | | Max. Foam Height (cm) | Time for Max. Foam Height (min) | Time Before Foam Starts to Shrink (min) | Max. Foam Height After Regeneration (cm) | Viscosity (sec) | Quality of Zinc Coating |
|---|---|---|---|---|---|---|---|---|---|---|---|---|---|
| Ex. | ZnCl₂ (%) | NH₄Cl (%) | NaCl (%) | KCl (%) | Sorbitol (%) | Pentaerythritol (%)* | Hexamethylenetetramine (%)* | | | | | | |
| 1 | 30.0 | 69.0 | 0 | 0 | 1.0 | — | — | 4.7 | 4.0 | 8 | 3.5 | 2.5 | Smooth - No Defects |
| 2 | 30.0 | 69.8 | 0 | 0 | 0.2 | — | — | 4.2 | 4.5 | 5 | 2.4 | 3.0 | " |
| 3 | 46.0 | 53.0 | 0 | 0 | 1.0 | — | — | 3.5 | 5.5 | 6 | 3.4 | 2.5 | " |
| 4 | 46.0 | 53.5 | 0 | 0 | 0.5 | — | — | 3.3 | 5.0 | 5.5 | 3.0 | 3.5 | " |
| 5 | 90.0 | 9.5 | 0 | 0 | 0.5 | — | — | 2.2 | 2.6 | 4.1 | 1.8 | 5.8 | " |
| 6 | 65.5 | 1.8 | 20.5 | 12.0 | 0.75 | — | — | 1.1 | 1.3 | 1.5 | 1.1 | 120 | " |
| A** | 30 | 69.0 | 0 | 0 | 0 | 1.0 | — | 4.0 | 4.2 | 6 | 3.2 | 25 | " |
| B** | 65.5 | 1.8 | 20.5 | 12.0 | 0 | 0 | 0.75 | 1.1 | 1.0 | 1.0 | 1.2 | 80 | " |

*commercial foaming agents
**commercial flux compositions

It was found that the use of sorbitol at more than 1% and at less than 0.2% levels gave less favorable results. When more than 1% sorbitol was used, the foam layer became so thick that a "hard" crust developed at the top of the flux (due to cooling), interfering with the galvanizing operation. The steel coupons could not be lowered into the molten zinc because they rested on the "crust".

When less than 0.2% was used, sufficient foam layer could not be built up for efficient galvanizing. In addition, the flux foam subsided quickly necessitating frequent regeneration by stirring or placing more fresh flux.

While the invention has been described in considerable detail in the above specification, it is to be understood that such detail is solely for the purpose of illustration and that variations can be made by those skilled in the art without departing from the spirit and scope of the invention.

What is claimed is:

1. A galvanizing flux consisting essentially of a fluxing material selected from zinc ammonium chloride double salt and a mixture of zinc chloride and ammonium chloride and sorbitol, the sorbitol being 0.2 to 1.0% by weight of the fluxing material.

2. The flux of claim 1 wherein the fluxing material is zinc ammonium chloride double salt.

3. The flux of claim 1 wherein the fluxing material is zinc chloride and ammonium chloride.

4. In a galvanizing process which comprises dipping a metal article into a molten bath of zinc covered by a flux composition consisting essentially of a fluxing material selected from a mixture of zinc chloride and ammonium chloride and zinc ammonium chloride double salt the improvement wherein the fluxing materials also contain as a foaming agent sorbitol in an amount of from 0.2 to 1.0% by weight of the fluxing material.

5. The process of claim 4 wherein the fluxing material is zinc ammonium chloride double salt.

6. The process of claim 4 wherein the fluxing material is a mixture of zinc chloride and ammonium chloride.

* * * * *